Figure 5:
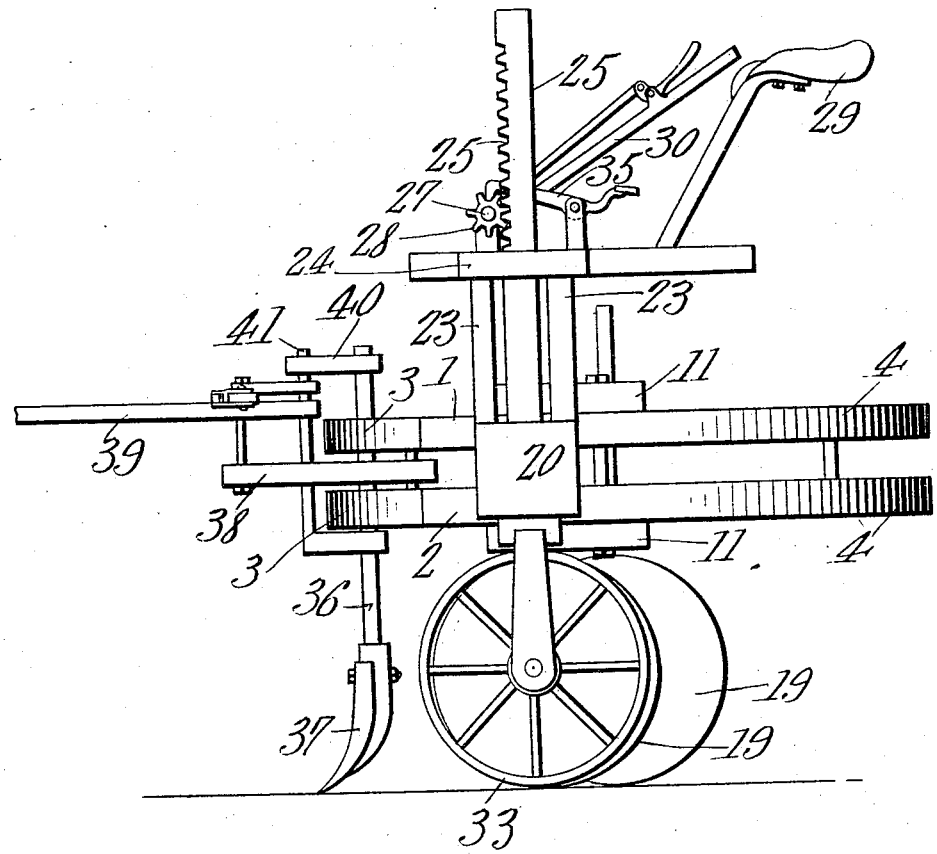

D. E. McDANIEL.
CULTIVATOR.
APPLICATION FILED JUNE 29, 1910.
968,588.
Patented Aug. 30, 1910.
3 SHEETS—SHEET 1.
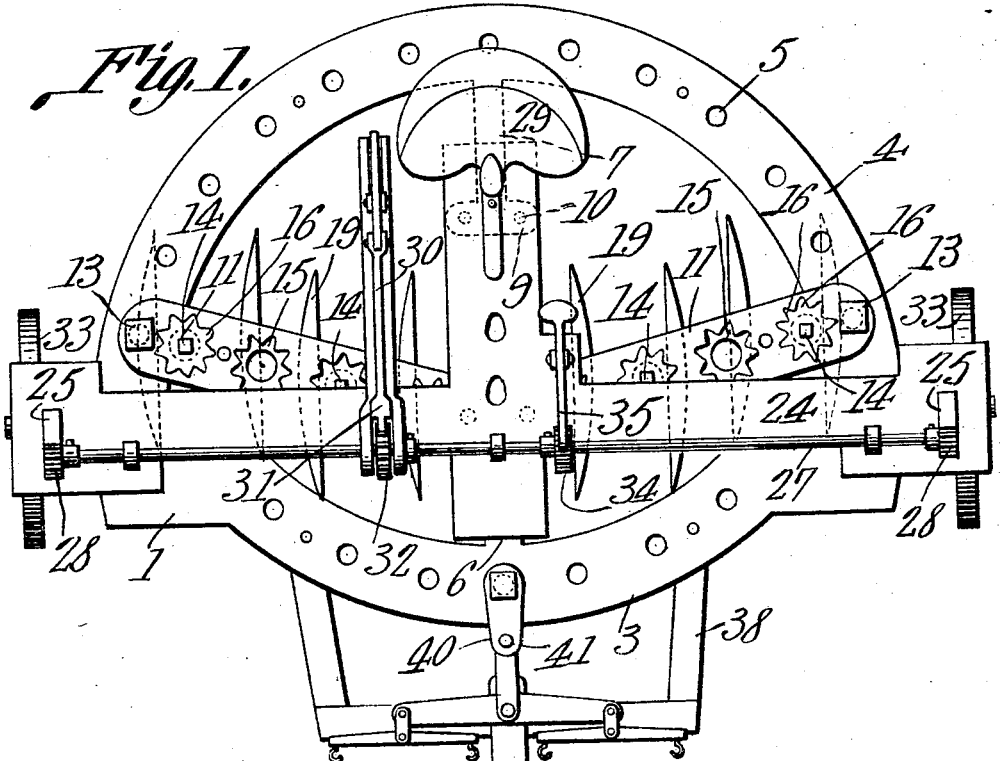
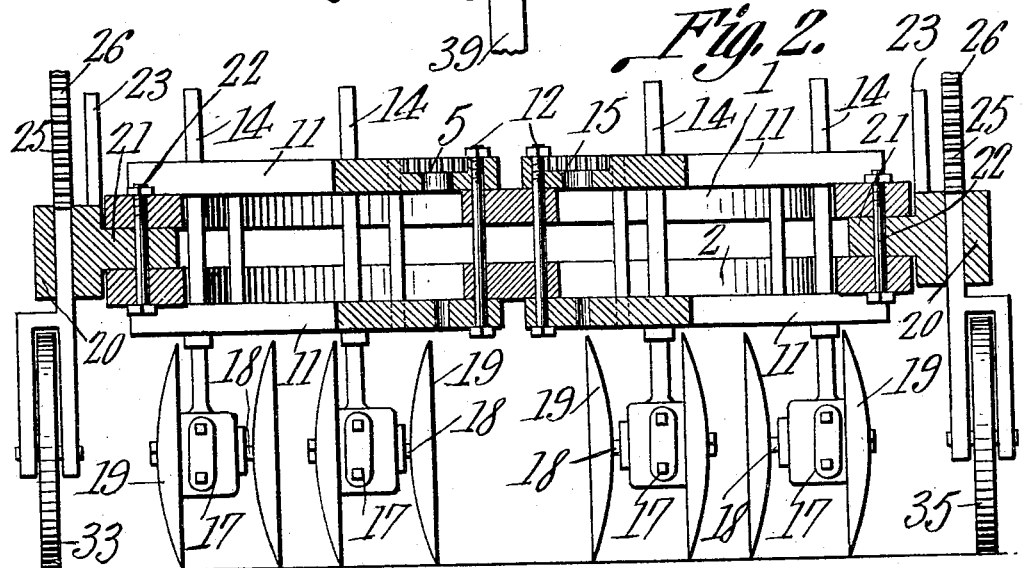
Witnesses
Duncan E. McDaniel, Inventor
by C. A. Snow & Co.
Attorneys

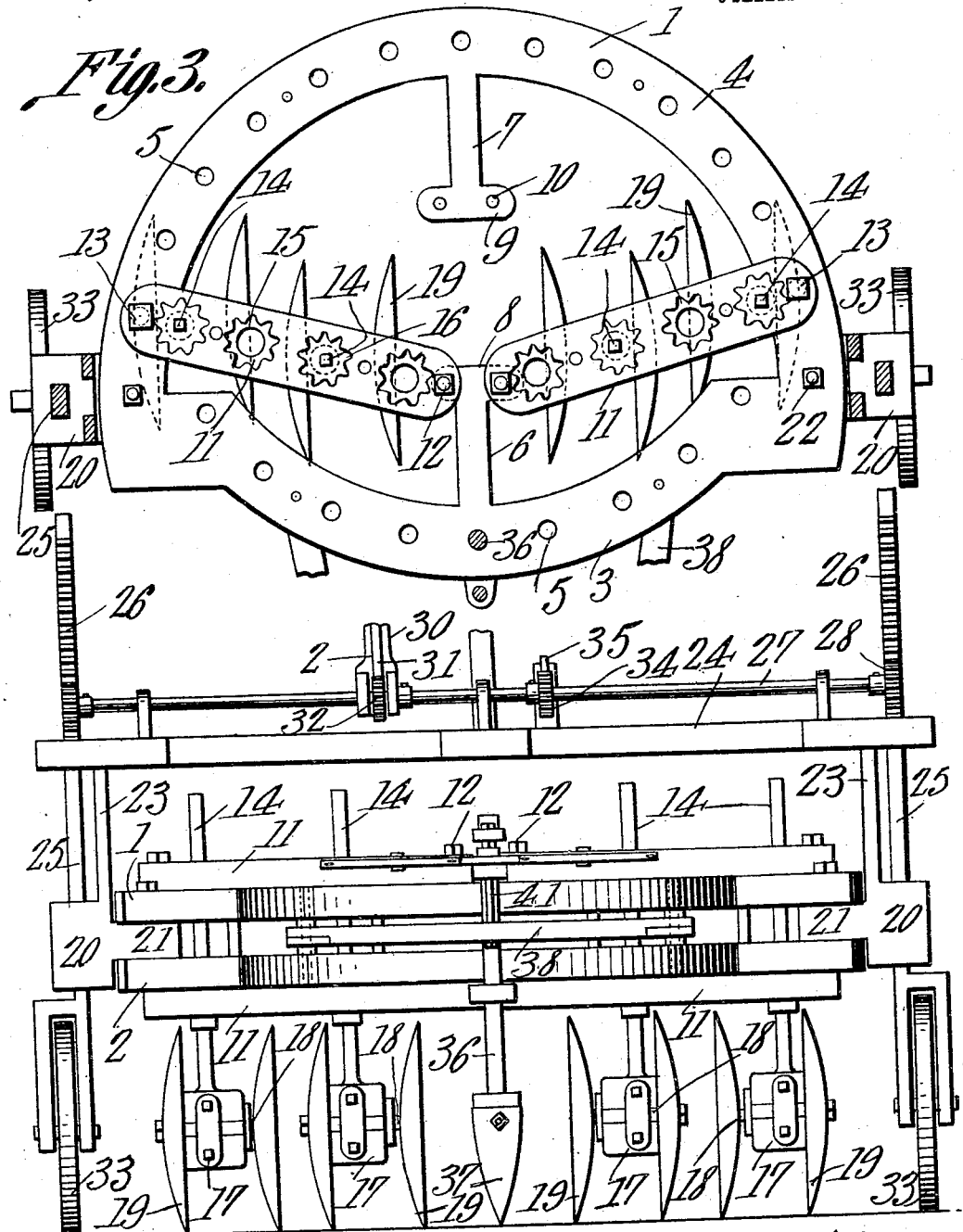

UNITED STATES PATENT OFFICE.

DUNCAN E. McDANIEL, OF HAMER, SOUTH CAROLINA.

CULTIVATOR.

968,588.  Specification of Letters Patent.  Patented Aug. 30, 1910.

Application filed June 29, 1910.  Serial No. 569,512.

*To all whom it may concern:*

Be it known that I, DUNCAN E. McDANIEL, a citizen of the United States, residing at Hamer, in the county of Dillon and State of South Carolina, have invented a new and useful Cultivator, of which the following is a specification.

This invention has relation to cultivators and consists in the novel construction and arrangement of parts as hereinafter shown and described.

The object of the invention is to provide a cultivator of such structure as to be susceptible of a variety of adjustments whereby the implement may be conveniently and effectually used as a straddle row or between row cultivator and may also be used for harrowing the soil and for breaking and bedding the fallow soil.

With this object in view the structure includes a frame of peculiar configuration with supporting wheels for the same and means for raising or lowering the frame with respect to the said supporting wheels. A draft means is attached to the frame and bars are adjustably connected with the frame. The said bars carry earth engaging members which may be adjusted with relation to the said bars.

In the accompanying drawings: Figure 1 is a top plan view of the cultivator. Fig. 2 is a transverse sectional view of the lower portion of the same. Fig. 3 is a horizontal sectional view of the same. Fig. 4 is a front elevation of the lower portion of the same. Fig. 5 is a side elevation of the same.

The frame of the cultivator consists of the upper and lower spaced members 1 and 2 which are of peculiar configuration and as the said members are of identical shape a description of one will answer for both. Each of the frame members is provided with an arcuate side portion 3 and arcuate portion 4. The portions 3 and 4 are bowed away from each other and the said portions are each provided with a series of perforations indicated at 5. The portions 3 and 4 of the frame members are provided with radially disposed arm portions 6 and 7 respectively and said arm members 6 and 7 are provided with lug extremities 8 and 9 respectively which in turn are provided with perforations indicated at 10. The perforations 10 upon the lug extremities 8 are concentric with the perforations 5 arranged upon the portions 4 of the frame members and the perforations 10 upon the lug extremities 9 of the arm portions 7 are concentric with the perforations 5 provided in the portions 3 of the frame members. Bars 11 are provided at their inner ends with bolts 12 which are adapted to be passed through the perforations 10 of the lug extremities 8 or 9 of the arm portions 6 and 7 and the said bars 11 are provided at their outer ends with bolts 13 which are adapted to be passed through the perforations 5 of the portions 3 and 4 of the frame members 1 and 2.

As illustrated in Fig. 3 of the drawing it will be seen that the bolts 12 are passed through the perforations 10 carried by the lug extremities 8 while the bolts 13 are passed through the perforations 5 provided in the portions 4 of the frame sections, but it is to be understood that the bolts 12 may be passed through the perforations 10 provided in the lug portions 9 of the arms 7 and the bolts 13 may be passed through the perforations 5 provided in the portions 3 of the frame members.

Standards 14 pass vertically through the upper and lower bars 11 and the upper bars 11 are provided in their upper sides with approximately star-shaped recesses 15 adapted to receive similarly shaped disks 16 fixed to the upper portions of the said standards 14. Boxes 17 are fixed to the lower ends of the standards 14 and carry spindles 18. Disks 19 are journaled for rotation upon the spindles 18 and the said disks are arranged in pairs with one member of each pair located at the opposite sides of the standards 14 from the other member of the pair carried by the said standards. By this arrangement it will be seen that by lifting the standards 14 so that the star-shaped disks 16 are elevated above the recesses 15 that the said standards 14 may be turned upon their axes and lowered, and when the star-shaped disks 16 again engage the star-shaped recesses 15 in the upper sides of the uppermost bars 11, the standards 14 will be held in fixed position and thus the disks 19 carried by the boxes 17 and spindles 18 may be pitched at any desired angle with relation to the line of draft of the implement. Also it will be seen that the bars 11 may be adjusted upon the frame members 1 and 2 to assume a great variety of positions and that the inner ends of the said bars may converge toward each other at the forward or rear portion of the frame of which the parts 1 and 2 are components.

Blocks 20 are provided with lugs 21 which are inserted between the edge portions of the members 1 and 2 and secured therein by means of bolts 22. The said blocks 20 are also provided with upstanding arms 23 which at their upper ends support a cross piece 24. Standards 25 are slidably mounted in the blocks 20 and the end portions of the cross piece 24 and are provided at their edges with gear teeth 26. A shaft 27 is journaled upon the cross piece 24 and is provided at its ends with pinions 28 which mesh with the teeth 26. A seat 29 is supported upon the cross piece 24. A lever 30 is fulcrumed upon the shaft 27 and is provided with a pawl 31 which is adapted to engage the teeth of a ratchet wheel 32. The said ratchet wheel is fixed to the shaft 27 and it will be seen that by swinging the lever 34 so that the pawl 31 engages the teeth of the said wheel 32 the said wheel together with the shaft 27 is rotated and in consequence of such rotation the standards 25 are moved vertically through the blocks 20 and the cross piece 24. Supporting wheels 33 are journaled for rotation at the lower ends of the standards 25 and thus as the said standards are moved the frame of which the parts 1 and 2 are components is raised or lowered with relation to the supporting wheels 33. A ratchet wheel 34 is also fixed to the shaft 27 and a holding pawl 35 is pivoted upon the cross piece 24 and is adapted to engage the teeth of the ratchet wheel 34 and hold the said shaft 27 against rotation after the parts have been properly adjusted.

A standard 36 may be passed vertically through any of the perforations 5 of the parts 1 and 2 but as illustrated in Fig. 4 of the drawing it is preferable to locate the said standard 36 in the perforations 5 midway between the ends of the frame members 1 and 2. The standard 36 at its lower end carries a plow point 37. When the implement is used for cultivating the soil between rows it is desirable to apply the standard 36 carrying the point 37 but when the implement is used for cultivating the soil at the opposite sides of a row the said standard 36 carrying the point 37 is removed when the implement may be used in a straddle row manner. A draft frame 38 may be attached to the portions 3 or 4 of the frame members 1 and 2 and the rear end of a draft tongue 39 is attached to the said draft frame 38. The standard 36 is provided with forwardly disposed arms 40 and when the said standard 36 is attached to the frame of which the parts 1 and 2 are components the rear end portion of the draft tongue 39 is connected with the arms 40 by means of a pivot bar 41 which passes transversely through the said arms and through the rear portion of the said tongue 39.

From the above description it will be seen that the parts of the cultivator are susceptible of a great variety of adjustments and by reason of this variety the parts may be positioned so as to effectually operate upon soils of different characters and for producing desired effects in the soil irrespective of its conditions.

What is claimed is:

1. A cultivator comprising a frame consisting of spaced members having oppositely disposed arcuate portions with radially disposed arm portions, bars adapted to be adjustably connected with the arcuate and arm portions of the frame members, standards carried by the bars, earth engaging members carried by the standards, supporting wheels for the frame, and means for raising and lowering with relation to said supporting wheels.

2. A cultivator comprising a frame consisting of spaced members having oppositely disposed arcuate portions and arm portions, bars adapted to be adjustably connected with the arcuate portions and arm portions of said frame members, some of the said bars having non-circular recesses, standards passing transversely through the bars and having non-circular disks adapted to fit within said recesses, earth engaging members carried by the standards, supporting wheels for the frame, and means for raising and lowering the frame with relation to the supporting wheels.

3. A cultivator comprising a frame consisting of spaced members having oppositely disposed arcuate portions and oppositely disposed arm portions, bars adapted to be adjustably attached to the arm portions and arcuate portions of the frame members, standards carried by the bars, earth engaging members carried by the standards, blocks located at the ends of the frame members, standards slidably mounted in said blocks, supporting wheels journaled in the lower ends of said standards, and means for moving the said standards through the blocks.

In testimony that I claim the foregoing as my own, I have hereto affixed my signature in the presence of two witnesses.

DUNCAN E. McDANIEL.

Witnesses:
C. B. ARNETTE,
J. P. McLAURIN.